H. BROWN.

BOX OR CRATE.

APPLICATION FILED SEPT. 22, 1915.

Reissued May 10, 1921.

15,100.

2 SHEETS—SHEET 1.

WITNESS

Frank A. Fable

INVENTOR

Hugh Brown,

BY

Hood & Ashby.

ATTORNEYS

H. BROWN.

BOX OR CRATE.

APPLICATION FILED SEPT. 22, 1915.

Reissued May 10, 1921.

15,100.

2 SHEETS—SHEET 2.

INVENTOR
Hugh Brown,

BY
Hood & Schley,
ATTORNEYS

UNITED STATES PATENT OFFICE.

HUGH BROWN, OF BATTLE CREEK, MICHIGAN, ASSIGNOR, BY MESNE ASSIGNMENTS, TO WIREBOUNDS PATENTS COMPANY, A CORPORATION OF MAINE.

BOX OR CRATE.

15,100. Specification of Reissued Letters Patent. Reissued May 10, 1921.

Original No. 1,133,001, dated March 23, 1915, Serial No. 753,311, filed March 10, 1913. Application for reissue filed September 22, 1915. Serial No. 52,133.

*To all whom it may concern:*

Be it known that I, HUGH BROWN, a citizen of the United States, residing at Battle Creek, in the county of Calhoun, State of Michigan, have invented a new and useful Box or Crate, of which the following is a specification.

An object of my invention is to produce a wire-bound box or crate blank of such character that it may be folded into box or crate form and held in that condition by means which may be readily removed without injury to any portion of the blank, so that the blank may be easily opened and reclosed and may be returned to its initial flat condition for shipment, storage and reuse.

A further object of my invention is to provide means by which the necessary box or crate ends may be placed and removed without the use of special tools, and in such manner that said ends may be easily withdrawn and replaced, whereby the parts may be easily reduced to "the flat" and reassembled in box or crate form.

Figure 1:
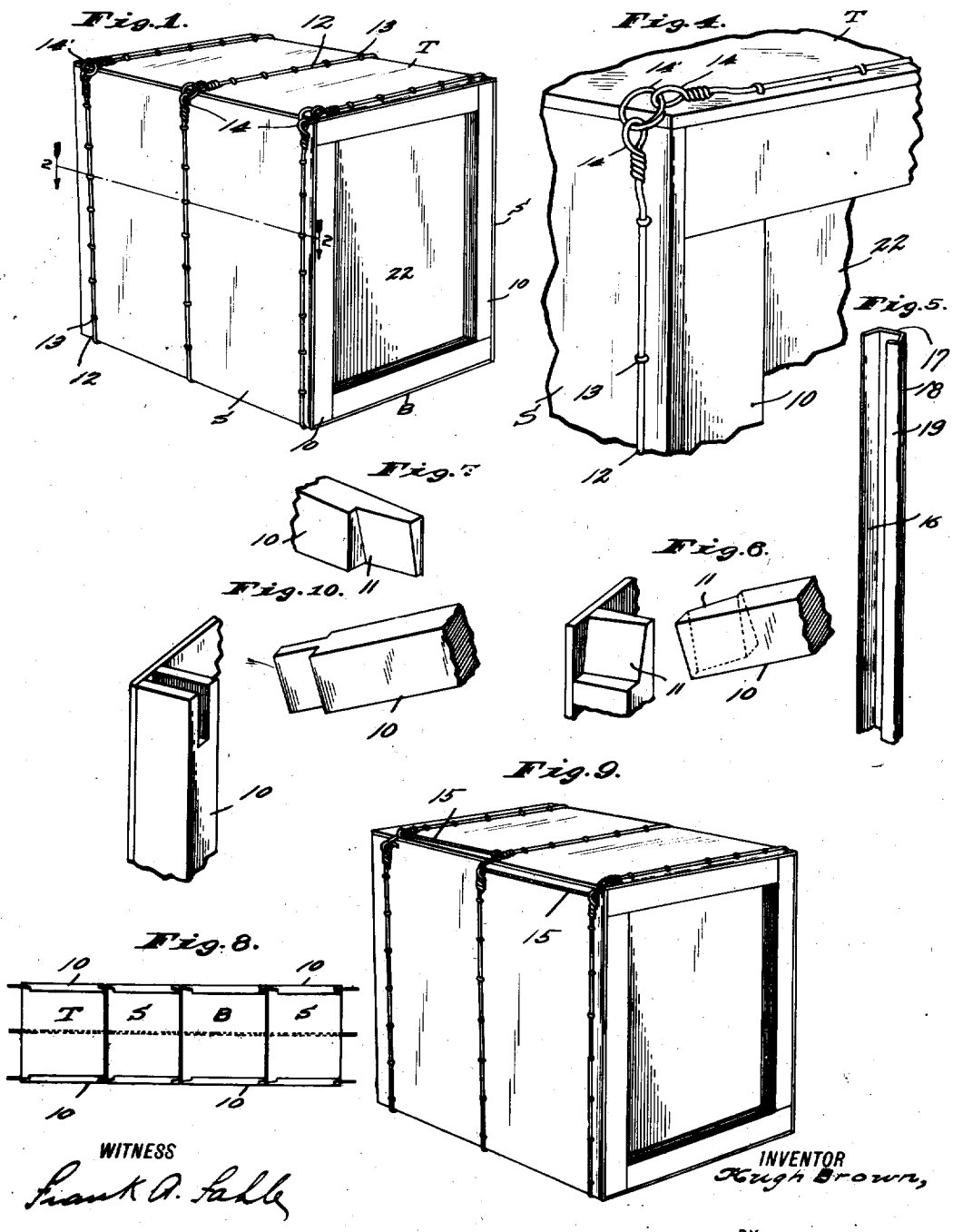
Figure 2:
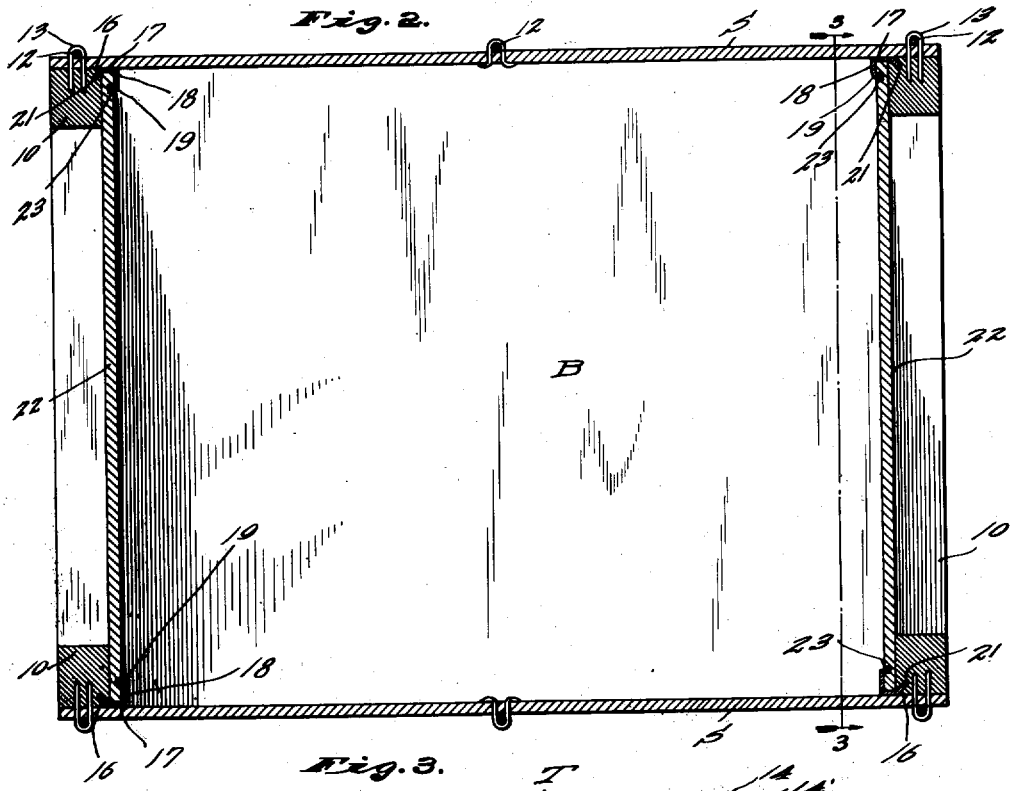
Figure 3:
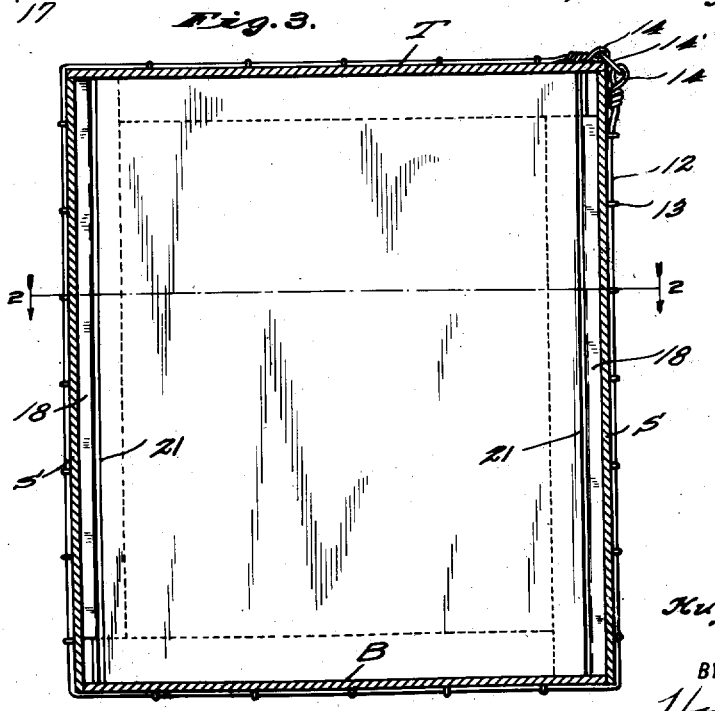

The accompanying drawings illustrate my invention. Figure 1 is a perspective view of a box embodying my improvements; Fig. 2 a horizontal section on line 2—2 of Figs. 1 and 3; Fig. 3 a vertical section on line 3—3 of Fig. 2; Fig. 4 a perspective view of one corner of the box and showing in larger detail the adjacent ends of one of the binding wires and the independent member for connecting them; Fig. 5 a perspective view of the metal slide for receiving the end members; Fig. 6 a perspective view of a desirable form for the mating ends of the cleats; Fig. 7 a reversed perspective of one of the cleats shown in Fig. 6; Fig. 8 a plan of the inner face of the blank when in "the flat"; Fig. 9 a perspective view, similar to Fig. 1, but showing a modified form of connection for holding the cover section closed; and Fig. 10 a perspective view of a pair of cleats having the common mortise and tenon ends.

In the drawings, B, S, S and T indicate the bottom, side and top sections, respectively, of a box or crate blank, each of these sections being preferably comparatively thin material, such, for instance, as veneer of cheap lumber, and also comprising cross cleats 10. The cleats 10 are so formed at their ends as to mate when the sections are folded into box form. In Fig. 6 I show cleats having rabbeted ends, the rabbeting being done upon a double angle, as shown at 11, thereby producing mating tongues which are stronger than tongues produced by the usual form of rabbeting.

The four sections of the blank are flexibly connected by binding wires 12 which extend from end to end of the four sections and are most conveniently secured in place by staples 13 which, if the binding wires lie over the cleats, may also serve to attach the cleats and sheets together in the usual manner.

Heretofore it has been customary to project the binding wires beyond the initial sections of the blank and to twist these projected ends together to hold the top closed. With such an arrangement it is practically necessary to cut the wires to open the box and the box cannot be used again without considerable difficulty. Instead of projecting the wires beyond the initial sections of the blank, therefore, I provide the ends of each binding wire with a permanent eye 14 which lies closely adjacent the initial edge of its section. In order to firmly hold the top closed, it is merely necessary to connect these adjacent eyes by independent fastening members which may be readily removed without injury to the eyes. The precise form of these fastening members is not specially important; they may be in the form of metal split rings 14′, as shown in Fig. 4, or a continuous wire, or even stout cord 15, as shown in Fig. 9, or any one of a number of forms which will be readily discernible by the skilled box maker.

It has heretofore been commonly the practice to nail or staple the box ends to the inner faces of the end cleats of the bottom and side sections. This requires specially designed nailing machines and the box cannot be readily reduced to the flat or blank form thereafter.

It has heretofore been proposed to provide means by which the ends could be slipped into place, but such prior devices have either been lacking in firmness of connection or have been too costly to manufacture.

In order to accomplish the desired result, I provide two metal guides of thin sheet metal. Each of these guides is bent to comprise an angularly disposed edge 16, two intermediate portions 17 and 18 lying at right angles to each other and an edge 19 lying substantia ly parallel with the portion 17. Along the inner edge of each of the cleats 10 of the sections S, I form a diagonally disposed kerf 21 arranged to receive the angularly disposed edge 16 of the metal guide in such manner that the portion 17 will lie parallel with, and preferably tightly against, the inner face of the sheet of section S (as clearly shown in Fig. 2), the edge of the portion 19 lying parallel with, but spaced from, the inner face of the cleat. By this arrangement the metal guides are held in place without special fastening members and the portions 19 are so placed as to laterally interlock with suitable portions of the end panels 22. The metal guides are comparatively small and may, therefore, be formed of quite thin material, being sufficiently braced by their arrangement relative to the cleats and sheets and by their interlocking with the end panels. If desired, the end panels may be of single thickness veneer unbraced by cross cleats, in which case, as shown in Fig. 2, the inner faces of the end sheets may have shallow and narrow grooves 23 formed in them to receive the portions 19 of the metal guides.

When the side sections S have been folded up at right angles to the bottom B, the ends 22 may be slipped downwardly into place, the lateral interlocking between the ends 22 and the portions 19 of the guides serving to hold the sides in place while the box is being loaded. The top is then closed and held in place by the independent fastening members. In order to dismember the parts for storage and further use, the fasteners are removed and the end panels withdrawn.

I claim as my invention:

1. A wirebound package, comprising a plurality of individual sections, each comprising a pair of cleats and connecting sheet material, binding wires attached to such sections so as to connect them in foldable relation, each of said binding wires carrying an eye at each end stopping short of registry with each other when the sections are folded, and a single fastening means passing through the several oppositely disposed eyes along an edge of the package to firmly hold the top section closed.

2. A wire-bound package blank comprising, a plurality of individual sections each comprising a pair of cleats and connecting sheet material, binding wires attached to such sections so as to connect them in foldable relation, and a pair of sheet metal guides, said guides being associated with opposite cleats of two opposite sections.

3. A wire-bound package blank comprising, a plurality of individual sections each comprising a pair of cleats and connecting sheet material, binding wires attached to such sections so as to connect them in foldable relation, a pair of sheet metal guides, each comprising an angularly arranged edge, two intermediate portions lying substantially at right angles to each other, and an edge coöperating with one of said intermediate portions to form a channel, said guides being associated with opposite cleats of two opposite sections by having their angularly arranged edges inserted in diagonally disposed kerfs formed in the inner edges of said cleats.

4. A wire-bound package comprising, a plurality of individual sections each comprising a pair of cleats and connecting sheet material, binding wires attached to such sections so as to connect them in foldable relation, a pair of sheet metal guides, said guides being associated with opposite cleats of two opposite sections, and end panels having portions which slidably engage and laterally-interlock with said guides.

5. A wire-bound package comprising, a plurality of individual sections each comprising a pair of cleats and connecting sheet material, binding wires attached to such sections so as to connect them in foldable relation, a pair of sheet metal guides each comprising an angularly arranged edge, two intermediate portions lying substantially at right angles to each other, and an edge cooperating with one of said intermediate portions to form a channel, said guides being associated with opposite cleats of two opposite sections by having their angularly arranged edges inserted in diagonally disposed kerfs formed in the inner edges of the cleats, and end panels having grooves which slidably engage and laterally interlock with said guides.

6. A wire-bound package comprising, a plurality of individual sections each comprising a pair of cleats and connecting sheet material, binding wires attached to such sections so as to connect them in foldable relation, a pair of sheet metal guides, said guides being associated with opposite cleats of two opposite sections, and end panels having grooves which slidably engage and laterally interlock with said guides.

7. A wire-bound package comprising, a plurality of individual sections each comprising a pair of cleats and connecting sheet material, binding wires attached to such sections so as to connect them in foldable relation, a pair of sheet metal guides each comprising an angularly arranged edge, two intermediate portions lying substantially at right angles to each other, and an edge coöperating with one of said intermediate portions to form a channel, said guides being associated with opposite cleats of two opposite sections by having their angularly arranged edges inserted in diagonally disposed kerfs formed in the inner edges of the cleats, and end panels having portions which slidably engage and laterally interlock with said guides.

8. In a knock-down package, the combination of side sections having flexible connections, cleats forming part of said sections and having mating ends, end panels, and guides arranged in kerfs in opposed cleats and retained in place between the side sections and the end panels.

9. A wire-bound package blank comprising, a plurality of individual sections each comprising a pair of cleats and connecting sheet material, binding wires attached to such sections so as to connect them in foldable relation, a pair of sheet metal guides, each comprising an angularly arranged edge and two adjacent portions substantially at right angles to each other, said guides being associated with opposite cleats of two opposite sections by having their angularly arranged edges inserted in diagonally disposed kerfs formed in the inner edges of said cleats.

10. A wire-bound package comprising a plurality of individual sections each comprising a pair of cleats and connecting sheet material, binding wires attached to such sections so as to connect them in foldable relation, a pair of sheet metal guides, each comprising an angularly arranged edge and two adjacent portions substantially at right angles to each other, said guides being associated with opposite cleats of two opposite sections by having their angularly arranged edges inserted in diagonally disposed kerfs formed in the inner edges of said cleats, and end panels having edges slidable between portions of the guides and the cleats carrying the same.

11. In a wirebound box having separably related adjacent sections, and complemental portions of a wire binding secured to said sections, detachable means tensionally separably connecting the respective portions of the wire binding to firmly hold the sections together.

12. A wirebound box having a wire binding secured thereto and separably connecting the top and side sections, said wire binding including detachable means tensionally connecting the respective end portions of the binding to firmly hold the top closed.

13. A wirebound box having a wire binding secured to and separably connecting adjacent sections of the box, the complemental portions of said binding secured to the respective sections terminating short of engagement, and separate means detachably tensionally joining said ends to firmly hold the sections together.

14. A wirebound box comprising foldably related side and bottom sections having coöperating end cleats and flexibly connected by wire bindings; removable end sections embraced thereby; and separate detachable means fastening the end sections and cleats of the side sections to hold the parts in box form independently of the lid.

15. A wirebound box comprising foldably related side and bottom sections having coöperating end cleats and flexibly connected by wire bindings; removable end sections; and separable locking strips joining the end sections and cleats of the side sections to hold the parts in box form independently of the lid.

16. A wirebound box comprising foldably related sections of side material and cleats for the four sides of the box flexibly connected by wire bindings; a removable end section; and separable locking means retaining the end section against inward or outward displacement.

17. A wirebound box comprising foldably related sections of side material and cleats for the four sides of the box flexibly connected by wire bindings; a removable end section; and separable locking means retaining the end section against outward displacement.

18. A wirebound box comprising foldably related sections of side material and cleats for the four sides of the box flexibly connected by wire bindings; a removable end section; and separable locking means therefor.

19. A wirebound box comprising foldably related sections of side material and cleats for the four sides of the box flexibly connected by wire bindings; a removable end section; and separable locking means for said end section adapted to detachably hold it against outward displacement.

20. In a wirebound box having cleats outlining the ends thereof, a removable end section; and separable locking means retaining the end section against outward displacement.

21. In a wirebound box having cleats outlining the ends thereof, a removable end section; and separable locking means therefor.

22. In a wirebound box having cleats outlining the ends thereof, the combination of a removable end section inside the cleats, and separable locking means to prevent outward displacement of said end section.

23. In a wirebound box having cleats outlining the ends thereof, the combination of a removable end section; and separable locking means adapted to permit the insertion of said end section inside the cleats and prevent its outward displacement.

24. In a wirebound box having cleats outlining the ends thereof, the combination of a removable end section constructed and arranged to be inserted inside the cleats; and separable locking means to prevent outward displacement thereof.

HUGH BROWN.